United States Patent
Naganawa et al.

(10) Patent No.: US 6,441,105 B2
(45) Date of Patent: Aug. 27, 2002

(54) SYNTHETIC FIBER TREATMENT AGENT COMPOSITION

(75) Inventors: Tsutomu Naganawa; Masaru Ozaki; Isao Ona; Tadashi Takimoto, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/835,428

(22) Filed: Apr. 16, 2001

(30) Foreign Application Priority Data

May 31, 2000 (JP) ........................................ 2000-161803

(51) Int. Cl.[7] ................................................ C08L 83/08
(52) U.S. Cl. ........................ 525/477; 528/38; 252/8.61; 252/8.63; 428/477; 524/838
(58) Field of Search ............................ 525/477; 528/38; 252/8.61, 8.63; 8/DIG. 1, 115.54; 428/447; 524/838

(56) References Cited

U.S. PATENT DOCUMENTS 4,704,419 A * 11/1987 Fukayama et al.
4,757,121 A * 7/1988 Tanaka et al.
6,054,523 A * 4/2000 Braun et al.

FOREIGN PATENT DOCUMENTS

| JP | 76-37996 | 11/1974 |
| JP | 78-19715 | 4/1975 |
| JP | 78-19716 | 8/1975 |
| JP | 83-01231 | 7/1977 |
| JP | 83-17310 | 1/1978 |
| JP | 07-305278 | 11/1995 |

* cited by examiner

Primary Examiner—Robert Dawson
Assistant Examiner—Marc S. Zimmer
(74) Attorney, Agent, or Firm—Charles R. Richard; Patricia M. Scaduto

(57) ABSTRACT

A synthetic fiber treatment agent composition capable of providing synthetic fibers, particularly synthetic fiber padding, with a better hand, smoothness, repulsion, and the like. The composition comprises an amino group-containing polyorganosiloxane with a high amino group content and specific terminal groups, and an amino group-containing polydiorganosiloxane with a low amino group content or a polydiorganosiloxane with no amino groups.

14 Claims, No Drawings

SYNTHETIC FIBER TREATMENT AGENT COMPOSITION

FIELD OF THE INVENTION

The present invention relates to a synthetic fiber treatment agent composition, and in particular to a synthetic fiber treatment agent composition capable of providing synthetic fiber padding with better smoothness, repulsion, and the like.

BACKGROUND OF THE INVENTION

Polyester fibers or acrylic fibers have been used conventionally for the synthetic fibers of padding. Polyester fibers in particular have a higher compression modulus and better recovery than synthetic fibers such as nylon, polyvinyl chloride, or polypropylene, making them suitable for mattress padding, pillows, cushions, costume padding, and the like. Many silicone-based fiber treatment agents have thus far been proposed to provide such polyester and acrylic fibers with better smoothness and repulsion. Examples include a treatment agent comprising a high molecular weight polydimethylsiloxane and an amino group-containing alkoxysilane (JP Patent Application Publication No. Sho 51-37996), treatment agents based on an epoxy group-containing siloxane and an amino group-containing alkoxysilane (JP Patent Application Publication Nos. Sho 53-19715 and Sho 53-19716), a treatment agent comprising an amino group-containing siloxane, epoxy group-containing siloxane, and amino group-containing alkoxysilane (JP Patent Application Publication No. Sho 58-1231), and treatment agents based on an amino group-containing siloxane and an amino group-containing alkoxysilane (JP Patent Application Publication No. Sho 58-17310 and JP Patent Application Laying Open No. Hei 7-305278). However, such treatment agents require an alkoxysilane to be blended in as a component for providing smoothness, resulting in alcohol by-products from the alkoxysilane during treatment. Treatment agents in which methoxysilane has been blended, for example, result in methanol by-products, and run the risk of polluting the working environment and of causing explosions.

As a result of extensive research to overcome such drawbacks, the inventors perfected the present invention upon discovering the effectiveness of combining an amino group-containing polyorganosiloxane with a high amino group content and specific terminal groups, and an amino group-containing polydiorganosiloxane with a low amino group content or a polydiorganosiloxane with no amino groups.

An object of the present invention is to provide a synthetic fiber treatment agent composition capable of providing synthetic fibers, particularly synthetic fiber padding, with better hand, smoothness, repulsion, and the like.

SUMMARY OF THE INVENTION

The present invention is a synthetic fiber treatment agent composition comprising (A) an amino group-containing polyorganosiloxane, where the terminals of the molecular chain are groups described by general formula

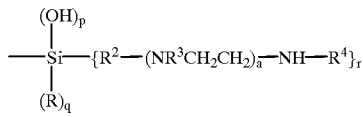

where R is a $C_1$ to $C_{20}$ optionally substitutable monovalent hydrocarbon or hydroxyl group, with at least 80 mol % of all R comprising monovalent hydrocarbon groups; $R^2$ is a $C_1$ to $C_{10}$ divalent hydrocarbon group; $R^3$ and $R^4$ are hydrogen atoms or $C_1$ to $C_{20}$ optionally substitutable monovalent hydrocarbon groups; a is an integer from 0 to 5; p is an integer from 0 to 2; q is an integer from 0 to 3, and r is 0 or 1, where (p+q+r)=3, and at least 30 mol % of all siloxane units per molecule are amino group-containing diorganosiloxane units described by general formula

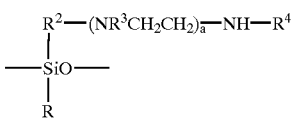

where R, $R^2$, $R^3$, $R^4$, and a are the same as above and (B) a polydiorganosiloxane described by general formula

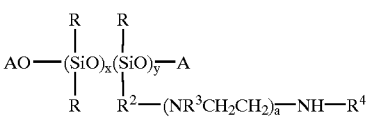

where A is selected from a group consisting of trialkylsilyl, a hydrogen atom, and a $C_1$ to $C_{20}$ optionally substitutable monovalent hydrocarbon group; R, $R^2$, $R^3$, $R^4$, and a are the same as above; x is an integer of 1 or more; and y is 0 or an integer of 1 or more, where y/(x+y) is no more than 0.1.

DESCRIPTION OF THE INVENTION

The present invention is a synthetic fiber treatment agent composition comprising (A) an amino group-containing polyorganosiloxane, where the terminals of the molecular chain are groups described by general formula

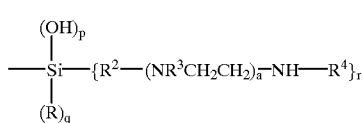

where R is a $C_1$ to $C_{20}$ optionally substitutable monovalent hydrocarbon or hydroxyl group, with at least 80 mol % of all R comprising monovalent hydrocarbon groups; $R^2$ is a $C_1$ to $C_{10}$ divalent hydrocarbon group; $R^3$ and $R^4$ are hydrogen atoms or $C_1$ to $C_{20}$ optionally substitutable monovalent hydrocarbon groups; a is an integer from 0 to 5; p is an integer from 0 to 2; q is an integer from 0 to 3, and r is 0 or 1, where (p+q+r)=3, and at least 30 mol % of all siloxane units per molecule are amino group-containing diorganosiloxane units described by general formula

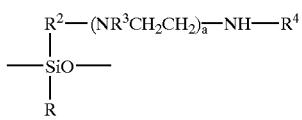

where R, $R^2$, $R^3$, $R^4$, and a are the same as above, and
(B) a polydiorganosiloxane described by general formula

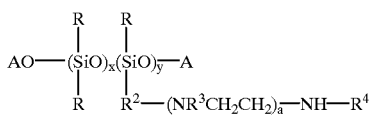

where A is a trialkylsilyl group, a hydrogen atom, or a $C_1$ to $C_{20}$ optionally substitutable monovalent hydrocarbon group; R, $R^2$, $R^3$, $R^4$, and a are the same as above; x is an integer of 1 or more; and y is 0 or an integer of 1 or more, where y/(x+y) is no more than 0.1.

The component (A) amino group-containing polyorganosiloxane is a component for providing synthetic fibers with better smoothness and repulsion. The polyorganosiloxane is characterized in that the terminals of the molecular chain are groups described by general formula

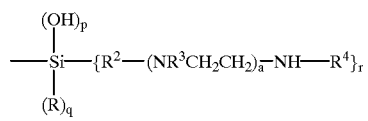

and at least 30 mol % of all siloxane units per molecule are amino group-containing diorganosiloxane units represented by general formula

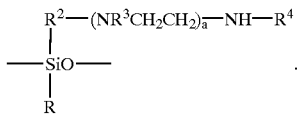

In the formulas, R is a $C_1$ to $C_{20}$ optionally substitutable monovalent hydrocarbon or hydroxyl group, with at least 80 mol % of all R comprising monovalent hydrocarbon groups. Examples of monovalent hydrocarbon groups include saturated aliphatic hydrocarbon groups such as methyl, ethyl, propyl, butyl, octyl, decyl, dodecyl, and tetradecyl; unsaturated aliphatic hydrocarbon groups such as vinyl and allyl; saturated alicyclic groups such as cyclopentyl and cyclohexyl; aromatic hydrocarbon groups such as phenyl, tolyl, and naphthyl; and such groups where some of the hydrogen atoms have been substituted with organic groups containing epoxy groups, halogen atoms, or the like. R may be the same or different, but is preferably a methyl group. $R^2$ is a $C_1$ to $C_{10}$ divalent hydrocarbon group, such as alkylene, arylene, or alkenylene. $R^2$ is preferably an ethylene or propylene group. $R^3$ and $R^4$ are hydrogen atoms or $C_1$ to $C_{20}$ optionally substitutable monovalent hydrocarbon groups. Specific examples of monovalent hydrocarbon groups include the same groups as those given for R. $R^3$ and $R^4$ may be the same or different, but are preferably hydrogen atoms. The symbol a is an integer from 0 to 5, but is preferably 0 or 1. The symbol p is an integer from 0 to 2, q is an integer from 0 to 3, and r is 0 or 1, where (p+q+r)=3. The content of the aforementioned amino group-containing diorganosiloxane units are at least 30 mol % of the total siloxane units, preferably at least 50 mol %, and even more preferably at least 70 mol %. This is because the intended effects are less likely to be achieved when the proportion of amino group-containing diorganosiloxane units is less than 30 mol %. Examples of units other than the aforementioned amino group-containing diorganosiloxane units of this component forming the polyorganosiloxane include siloxane units represented by $R^2SiO_{2/2}$, $RSiO_{3/2}$, $R^4$—NH—$(CH_2CH_2NR^3)_a$-$R^2$-$SiO_{3/2}$, $R^3SiO_{1/2}$, and $SiO_{4/2}$ (where R, $R^2$, $R^3$, $R^4$, and a are the same as above). The proportion of such siloxane units is limited only to the extent that the effects of the present invention are not compromised. The molecular structure of this component is preferably linear or linear with partial branches. The viscosity of component (A) at 25° C. is usually 10 to 100,000 $mm^2$/s, and the degree of polymerization of linear polyorganosiloxanes is preferably within the range of 2 to 1000, and more preferably 10 to 500. An example of a method for producing component (A) is to add an excess amount of water to N-β-(aminoethyl)-γ-aminopropylmethyldimethoxysilane, heat the mixture to 70° C. to ensure complete hydrolysis, and then heat the product at reduced pressure to remove the methanol and water. In another method, N-β-(aminoethyl)-γ-aminopropylmethyldimethoxysilane is mixed with silanol-terminated polydimethylsiloxane, an excess amount of water and potassium hydroxide are added, the material is heated, the aminosilane is hydrolyzed at 70° C., and the aminosilane hydrolysate and silanol-terminated polydimethylsiloxane are copolymerized as the water and methanol are removed at 90° C.

Specific examples of component (A) include polyorganosiloxanes represented by the following average formulas.

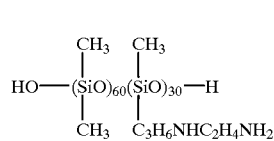

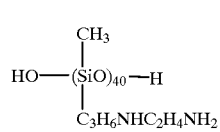

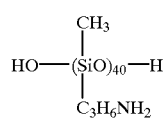

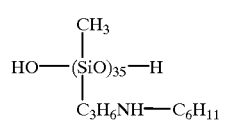

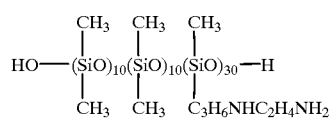

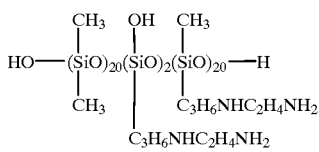  (6)

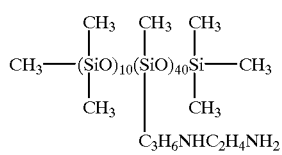  (7)

The polydiorganosiloxane (B) is described by general formula

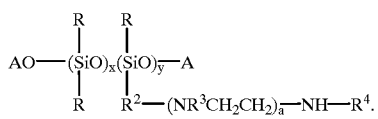

In the formula, A is selected from the group consisting of trialkylsilyl, hydrogen atom, and $C_1$ to $C_{20}$ optionally substitutable monovalent hydrocarbon groups, and is preferably a hydrogen atom or monovalent hydrocarbon group. Specific examples of monovalent hydrocarbons include the same as those for R above, although alkyl groups are preferred. The symbol x is an integer of 1 or more; and y is 0 or an integer of 1 or more. Although the maximum for x and y is not particularly limited, the value selected should result in a polydiorganosiloxane having a viscosity of at least 50 mm$^2$/s in order to provide softness, smoothness, and repulsion. A viscosity of 300 to 30,000 mm$^2$/s is even more desirable. The ratio y/(x+y) is no more than 0.1, and preferably no more than 0.02. A value greater than 0.1 will not provide satisfactory smoothness, and will result in pronounced yellowing caused by the amino groups. Although R, $R^2$, $R^3$, $R^4$, and a are the same as above, at least 80 mol % of R should be methyl groups in order to provide the fiber with a better hand. Amino groups represented by —$R^2$—(N$R^3$CH$_2$CH$_2$)$_a$—NH—$R^4$ are commonly groups represented by —C$_3$H$_6$—(NHCH$_2$CH$_2$)$_a$NH$_2$.

The method for producing component (B) is not particularly limited. In one specific example, a polydimethylsiloxane blocked at both ends with silanol groups and N-β-(aminoethyl)-γ-aminopropylmethyldimethoxysilane are allowed to react for a specified time at 90° C. in the presence of a basic catalyst such as potassium hydroxide, and the basic catalyst is then neutralized with an acid. Component (B) may be one type structure used by itself, or a mixture of two or more different types of structures. Preferred mixtures include a polydiorganosiloxane containing no amino groups, where y in the aforementioned formula is 0, and a polydiorganosiloxane that contains amino groups, where y is 1 or more. The mixing ratio preferably ranges from 1:99 to 99:1.

Specific examples of component (B) include the polydiorganosiloxanes represented by the following average formulas.

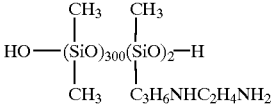  (8)

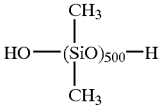  (9)

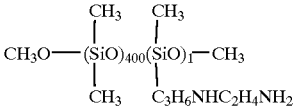  (10)

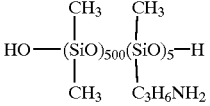  (11)

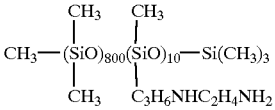  (12)

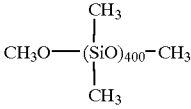  (13)

Components (A) and (B) are preferably blended in a ratio of 1 to 50 weight parts, and even more preferably 2 to 30 weight parts component (A) per 100 weight parts component (B).

The present composition is based on the aforementioned components (A) and (B), but other components may also be added as needed, such as antistatic agents, non-silicone-based organic softeners, alkoxysilanes, or partial hydrolysates thereof, which have reactive groups such as amino groups or epoxy groups, alkylalkoxysilanes or partial hydrolysates thereof, preservatives, and anti-mildewing agents. When fiber yellowing caused by the amino groups in the present composition becomes a problem, compounds having groups that are reactive with amino groups such as epoxy compounds or organic acids or their anhydrides can be added to suppress yellowing caused by amino groups.

The present composition is usually diluted with a solvent and adjusted to the prescribed concentration, or is emulsified and dispersed in water using a surfactant to produce an emulsion, which is then diluted with water and adjusted to the prescribed concentration before use. Emulsion dispersions in water are particularly desirable. Examples of surfactants which may be used for emulsification include polyoxyethylene alkyl ethers or polyoxyethylene-polyoxypropylene alkyl ethers, which have alkyl groups such as lauryl, cetyl, stearyl, or trimethylnonyl groups; polyoxyethylene alkylphenyl ethers having alkylphenyl groups such as nonylphenyl or octylphenyl; polyethylene glycol fatty acid esters comprising the addition polymerization of ethylene oxide to fatty acids such as stearic acid or oleic acid; nonionic surfactants such as polyoxyethylene glycerin fatty acid esters and polyglycerin fatty acid esters; anionic surfactants such as alkylsulfates and alkylbenzenesulfonates; cationic surfactants such as quaternary ammonium salts and alkylamine salts; and amphoteric surfactants such as alkylbetaines and alkylimidazolines. Examples of ways to prepare emulsions include methods in which components (A) and (B) are separately emulsified using the aforementioned surfactants, and the two emulsions are then mixed; and methods in which components (A) and (B) are mixed, and are then emulsified using the aforementioned surfactants. Examples of emulsifying devices which may be used include homomixers, homogenizers, propeller-bladed agitators, line mixers, and colloid mills. The polyorganosiloxane of component (A) is water-soluble when containing a large amount of the aforementioned amino group-containing diorganosiloxane units. In such cases, therefore, the emulsion of component (B) can be prepared, and component (A) can then be blended therein as such, or an aqueous solution of component (A) can be prepared first, and then blended in an emulsion of component (B). When fibers are treated, a solution or emulsion of the composition of the present invention is applied to the fibers by impregnation, spraying, or another means, and the fibers are then preferably dried and heat treated. When an emulsion of the present composition is used, the amount applied to the fibers should result in 0.1 to 3 wt % composition in terms of solids.

The present composition characteristically provides synthetic fibers, particularly synthetic fiber padding, with excellent hand, smoothness, repulsion, and the like. The present invention is, in particular, able to provide smoothness as good as that provided by alkoxysilanes conventionally used to provide smoothness, but without the use of such alkoxysilanes. Another advantage is the extremely low level of alcohol by-products during treatment.

EXAMPLES

The present invention is illustrated in detail in the following examples. Parts in the examples are based on weight, and the viscosity was determined at 25° C.

Synthesis Example 1

Synthesis of polyorganosiloxane (A) containing amino groups. 20 Parts water were added to 100 parts N-β-(aminoethyl)-γ-aminopropylmethyldimethoxysilane, and the mixture was stirred for 2 hours at 70° C. The methanol and water were then removed at 90° C. under reduced pressure to synthesize the water-soluble amino group-containing polyorganosiloxane (A) described by formula

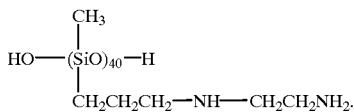

Synthesis Example 2

Synthesis of polyorganosiloxane (B) containing amino groups. 100 Parts N-β-(aminoethyl)-γ-aminopropylmethyldimethoxysilane, 8 parts polydimethylsiloxane blocked at both ends with silanol groups (viscosity 100 mm²/s), and 0.1 part potassium hydroxide at a concentration of 50% were mixed, and 17 parts water were added as the above was mixed. The mixture was then heated to 80° C. and held there for 2 hours, and it was then maintained for 3 hours at 90° C. under reduced pressure to remove the water and methanol. The product was then neutralized with 0.05 part acetic acid to synthesize water-soluble amino group-containing polyorganosiloxane (B) described by average formula

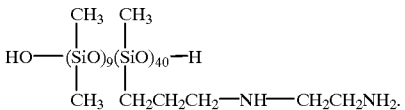

Synthesis Example 3

Synthesis of polyorganosiloxane (C) containing amino groups. 100 Parts N-β-(aminoethyl)-γ-aminopropylmethyldimethoxysilane, 2.7 parts N-β-(aminoethyl)-γ-aminopropyltrimethoxysilane, 36 parts polydimethylsiloxane blocked at both ends with silanol groups (viscosity 100 mm²/s), and 0.1 part potassium hydroxide with a concentration of 50% were mixed, and 20 parts water were added as the above was mixed. The mixture was then heated to 80° C. and held there for 2 hours, and it was then maintained for 3 hours at 90° C. under reduced pressure to remove the water and methanol. The product was then neutralized with 0.05 part acetic acid to synthesize water-soluble, silanol group-terminated, amino group-containing polyorganosiloxane (C) described by average formula $$\begin{array}{ccc} CH_3 & CH_3 & (CH_2)_3NH(CH_2)_2NH_2 \\ | & | & | \\ (SiO)_{40}(SiO)_{40}(SiO_{3/2})_1 \\ | & | \\ CH_3 & (CH_2)_3NH(CH_2)_2NH_2 \end{array}.$$

Synthesis Example 4

Synthesis of polyorganosiloxane (D) containing amino groups. 4.3 parts water were added to 100 parts N-β-(aminoethyl)-γ-aminopropylmethyldimethoxysilane, and the mixture was stirred for 2 hours at 70° C. The methanol was then removed at 60° C. under reduced pressure to synthesize amino group-containing polyorganosiloxane (D) described by formula

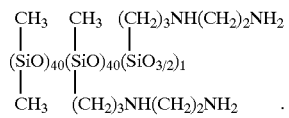

Synthesis Example 5

Synthesis of polydiorganosiloxane (E). 100 Parts polydimethylsiloxane blocked at both ends with silanol groups (viscosity 100 mm²/s) and 1.1 part hydrolysate of N-β-(aminoethyl)-γ-aminopropylmethyldimethoxysilane hydrolyzed in an excess amount of water, and 0.3 part 50% potassium hydroxide aqueous solution were mixed, and the mixture was stirred for 2 hours at 140° C. 0.2 Part acetic acid was then added for neutralization, giving polydiorganosiloxane (E) described by average formula

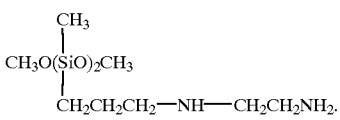

Synthesis Example 6

Synthesis of polydiorganosiloxane (F). 100 Parts polydimethylsiloxane blocked at both ends with silanol groups (viscosity 100 mm²/s) and 1.4 part N-β-(aminoethyl)-γ-aminopropylmethyldimethoxysilane were mixed, and were heated to 80° C. while stirred, and 0.3 part 50% potassium hydroxide aqueous solution was then added. Nitrogen was then allowed to flow from a capillary tube inserted in the liquid and the material was maintained for 6 hours at a reduced pressure of 60 mmHg at 80° C. to remove the water and methanol. 0.2 Part acetic acid was then added for neutralization, giving polydiorganosiloxane (F) described by average formula

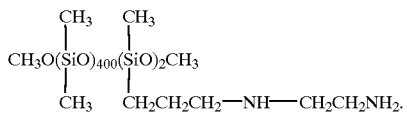

Synthesis Example 7

Synthesis of polydiorganosiloxane (G). 100 Parts polydimethylsiloxane blocked at both ends with silanol groups (viscosity 100 mm²/s) and 4 parts N-β-(aminoethyl)-γ-aminopropylmethyldimethoxysilane hydrolysate were mixed, and were heated to 80° C. while stirred, and 0.3 part 50% potassium hydroxide aqueous solution was then added. The material was maintained for 6 hours as nitrogen was then allowed to flow from a capillary tube inserted in the liquid. 0.2 Part acetic acid was then added for neutralization, giving polydiorganosiloxane (G) described by average formula

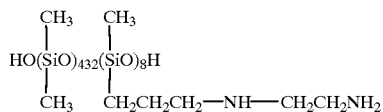

Synthesis Example 8

Synthesis of polydiorganosiloxane (H). 0.3 Part 50% potassium hydroxide aqueous solution was added to 100 parts polydimethylsiloxane blocked at both ends with silanol groups (viscosity 100 mm²/s), and the mixture was heated to 50° C. while stirred and held there for 1 hour. 0.2 Part acetic acid was then added for neutralization, giving polydiorganosiloxane (H) described by average formula

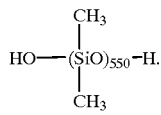

Synthesis Example 9

Preparation of aqueous solutions of amino group-containing polyorganosiloxanes (A) through (D). 50 Parts of the amino group-containing polyorganosiloxane (A) obtained in Synthesis Example 1 were mixed with 50 parts water to prepare a 50 wt % aqueous solution (SA). 50 Parts of the amino group-containing polyorganosiloxane (B) obtained in Synthesis Example 2 were mixed with 50 parts water to prepare a 50 wt % aqueous solution (SB). 50 Parts of the amino group-containing polyorganosiloxane (C) obtained in Synthesis Example 3 were mixed with 50 parts water to prepare a 50 wt % aqueous solution (SC). 50 Parts of the amino group-containing polyorganosiloxane (D) obtained in Synthesis Example 4 were mixed with 50 parts water to prepare a 50 wt % aqueous solution (SD).

Synthesis Example 10

Preparation of emulsions of polydiorganosiloxanes (E) through (H). 300 Parts of the polydiorganosiloxane (E) obtained in Synthesis Example 5 were emulsified and dispersed in 260 parts water in a homomixer using 40 parts polyoxyethylene (6 mol) lauryl ether as the nonionic surfactant, so as to prepare an emulsion (EE) containing 50 wt % polydiorganosiloxane. 300 Parts of the polydiorganosiloxane (F) obtained in Synthesis Example 6 were emulsified and dispersed in 260 parts water in a homomixer using 40 parts polyoxyethylene (6 mol) lauryl ether as the nonionic surfactant, so as to prepare an emulsion (EF) containing 50 wt % polydiorganosiloxane. 300 Parts of the polydiorganosiloxane (G) obtained in Synthesis Example 7 were emulsified and dispersed in 260 parts water in a homomixer using 40 parts polyoxyethylene (6 mol) lauryl ether as the nonionic surfactant, so as to prepare an emulsion (EG) containing 50 wt % polydiorganosiloxane. 300 Parts of the polydiorganosiloxane (H) obtained in Synthesis Example 8 was emulsified and dispersed in 260 parts water in a homomixer using 40 parts polyoxyethylene (6 mol) lauryl ether as the nonionic surfactant, so as to prepare an emulsion (EH) containing 50 wt % polydiorganosiloxane.

Examples 1 Through 9

The aqueous solutions and emulsions obtained in Synthesis Examples 9 and 10 were blended in the amounts given in Table 1 to prepare synthetic fiber treatment agents. The resulting treatment agents were sprayed onto polyester staple fibers (6 d, 65 mm long) for mattress padding so that a total amount of 0.5 wt % polyorganosiloxane adhered to the fibers, and the material was dried at room temperature, followed by 5 minutes of heat treatment at 150° C. The treated polyester mattress padding was carded with a Labromixer (Textest) and superposed to prepare padding for evaluation. The resulting padding was manually assessed for smoothness and repulsion according to the following criteria. The amount of methanol contained in the resulting synthetic fiber treatment agent compositions (theoretical amount) was calculated by the following formula. The results are given in Table 1.

Smoothness

*: downy-like hand, with ample smoothness

O: smooth hand

Δ: somewhat coarse, with a hand characterized by somewhat inferior smoothness x: coarse, with a hand characterized by a lack of smoothness $$\text{amt. of methanol} = \frac{\text{number methoxy groups per molecule} \times 32 \times 100}{\text{molecular weight of methoxy group-containing compound}} \times \frac{\text{content (parts) of methoxy group-containing compound in synthetic fiber treatment agent}}{\text{total amount (parts) of each component in Table 1}} \quad \text{Equation 1}$$

-continued (note) methoxy group-containing compound: silane containing methoxy groups, or siloxane blocked at both ends with methoxy groups

Comparative Examples 1 Through 5

The emulsions and aqueous solutions obtained in Synthesis Examples 9 and 10 were used to prepare synthetic fiber treatment agents using the amounts shown in Table 1. The resulting treatment agents were used to treat polyester staple fibers for mattress padding in the same manner as in Example 1, and the material was carded to produce mattress padding. The resulting padding was assessed for smoothness, repulsion, and methanol content in the same manner as in Example 1. The results are given in Table 1.

Comparative Examples 6 and 7

N-β-(aminoethyl)-γ-aminopropylmethyldimethoxysilane was added in the amounts shown in Table 1 to the emulsions EE and EH obtained in Synthesis Example 10 to prepare synthetic fiber treatment agents. The resulting treatment agents were used to treat polyester staple fibers for mattress padding in the same manner as in Example 1, and the material was carded to produce mattress padding. The resulting padding was assessed for smoothness, repulsion, and methanol content in the same manner as in Example 1. The results are given in Table 1.

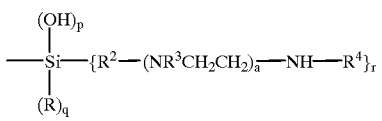

where each R is selected from a $C_1$ to $C_{20}$ monovalent hydrocarbon group, a substituted $C_1$ to $C_{20}$ monovalent hydrocarbon group, and a hydroxyl group, with at least 80 mol % of all the R comprising monovalent hydrocarbon groups and substituted monovalent hydrocarbon groups; $R^2$ is a $C_1$ to $C_{10}$ divalent hydrocarbon group; $R^3$ and $R^4$ are each selected from hydrogen atoms, $C_1$ to $C_{20}$ monovalent hydrocarbon groups, and substituted $C_1$ to $C_{20}$ monovalent hydrocarbon groups; a is an integer from 5 to 5; p is an integer from 0 to 2; q is an integer from 0 to 3, and r is 0 or 1, where (p+q+r)=3, and at least 30 mol % of all siloxane units per molecule are amino group-containing diorganosiloxane units described by general formula

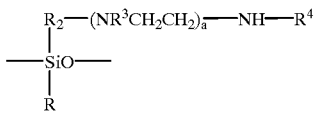

TABLE 1

| | Blended composition (weight parts) | | | | | | | | aminosilane | Evaluation | | Methanol content (%, theoretical) |
|---|---|---|---|---|---|---|---|---|---|---|---|---|
| | Component (A) | | | | Component (B) | | | | | | | |
| | SA | SB | SC | SD | EE | EF | EG | EH | *1 | smoothness | repulsion | |
| Example 1 | 8 | — | — | — | 100 | — | — | — | — | * | O | 0 |
| Example 2 | 2 | — | — | — | 100 | — | — | — | — | O | O | 0 |
| Example 3 | 30 | — | — | — | 100 | — | — | — | — | * | O | 0 |
| Example 4 | — | 10 | — | — | 100 | — | — | — | — | * | O | 0 |
| Example 5 | — | — | 20 | — | 100 | — | — | — | — | * | O | 0 |
| Example 6 | — | 10 | — | — | — | 100 | — | — | — | * | O | 0.10 |
| Example 7 | — | 6 | — | — | — | — | 100 | — | — | O | O | 0 |
| Example 8 | 20 | — | — | — | — | — | — | 100 | — | * | O | 0 |
| Example 9 | — | 10 | — | — | — | 50 | — | 50 | — | * | O | 0.05 |
| Comp. Ex. 1 | — | — | — | — | 100 | — | — | — | — | Δ | X | 0 |
| Comp. Ex. 2 | — | — | — | — | — | 100 | — | — | — | Δ | X | 0.11 |
| Comp. Ex. 3 | — | — | — | — | — | — | 100 | — | — | Δ | Δ | 0 |
| Comp. Ex. 4 | — | — | — | — | — | — | — | 100 | — | X | X | 0 |
| Comp. Ex. 5 | — | — | — | 20 | 100 | — | — | — | — | O | O | 1.46 |
| Comp. Ex. 6 | — | — | — | — | 100 | — | — | — | 10 | * | O | 2.82 |
| Comp. Ex. 7 | — | — | — | — | — | — | — | 100 | 20 | O | O | 5.18 |

*1: N-β-(aminoethyl)γ-aminopropylmethyldimethoxysilane

We claim:

1. A synthetic fiber treatment agent composition comprising (A) an amino group-containing polyorganosiloxane, where the terminals of the molecular chain are groups described by general formula where R, $R^2$, $R^3$, $R^4$, and a are the same as above and (B) a mixture of a polydiorganosiloxane where y is 0 and an amino group-containing polydiorganosiloxane in which y is an integer of 1 or more, in each case described by general formula

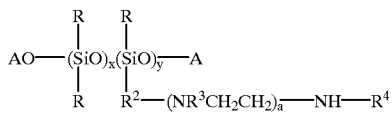

where each A is selected from a trialkylsilyl group, a hydrogen atom, a $C_1$ to $C_{20}$ monovalent hydrocarbon group, and a substituted $C_1$ to $C_{20}$ monovalent hydrocarbon group; R, $R^2$, $R^3$, $R^4$, and a are the same as above; x is an integer of 1 or more; where $y/(x+y)$ is no more than 0.1.

2. A synthetic fiber treatment agent composition according to claim 1, where A in component (B) is a hydrogen atom or $C_1$ to $C_{20}$ alkyl group.

3. A synthetic fiber padding treated with the synthetic fiber treatment agent composition of claim 1.

4. A synthetic fiber padding treated with the synthetic fiber treatment agent composition of claim 2.

5. A synthetic fiber treatment agent composition according to claim 1, where a is an integer of 0 or 1.

6. A synthetic fiber treatment agent composition according to claim 1, where the content of the amino group-containing diorganosiloxane units in component (A) is at least 50 mol %.

7. A synthetic fiber treatment agent composition according to claim 1, where the content of the amino group-containing diorganosiloxane units in component (A) is at least 70 mol %.

8. A synthetic fiber treatment agent composition according to claim 1, where component (A) as a degree of polymerization of 10 to 500.

9. A synthetic fiber treatment agent composition according to claim 1, where component (B) has a viscosity at 25° C. of 300 to 30,000 $mm^2/s$.

10. A synthetic fiber treatment agent composition according to claim 1, where in component (B) the ratio of $y/(x+y)$ is no more than 0.02.

11. A synthetic fiber treatment agent composition according to claim 1, comprising 1 to 50 weight parts of component (B) per 100 weight parts of component (A).

12. A synthetic fiber treatment agent composition according to claim 1, comprising 2 to 30 weight parts of component (B) per 100 weight parts of component (A).

13. A synthetic fiber treatment agent composition according to claim 1, further comprising a solvent as a diluent.

14. A synthetic fiber treatment agent composition according to claim 1, where the composition is an emulsion.

* * * * *